United States Patent [19]

Byfuglien

[11] 4,231,393

[45] Nov. 4, 1980

[54] ARRANGEMENT IN OR RELATING TO A VALVE

[75] Inventor: Arne Byfuglien, Nygard, Norway

[73] Assignee: A/S Raufoss Ammunisjonsfabrikker, Raufoss, Norway

[21] Appl. No.: 39,141

[22] Filed: May 15, 1979

[30] Foreign Application Priority Data

May 19, 1978 [NO] Norway .................................. 781751

[51] Int. Cl.$^3$ ............................................. F16K 31/122
[52] U.S. Cl. .................................... 137/491; 137/492; 137/495
[58] Field of Search ............... 137/495, 491, 489, 488, 137/492, 492.5; 251/25, 33, 44

[56] References Cited

U.S. PATENT DOCUMENTS

| | | | |
|---|---|---|---|
| 3,478,776 | 11/1969 | Royer | 137/491 |
| 3,747,633 | 7/1973 | Garrett | 137/491 X |

*Primary Examiner*—Alan Cohan
*Attorney, Agent, or Firm*—Larson, Taylor and Hinds

[57] ABSTRACT

The present invention relates to an arrangement in or relating to a valve comprising a housing having an inlet and an outlet whose interconnection is closable by means of a differential piston slidably arranged in a cylinder in the housing, said differential piston being equipped with a bore interconnecting its large and small sides, said valve further comprising a conduit or the like leading from the chamber in the housing on the large side of the differential piston to the outlet, said conduit or the like being equipped with a pilot valve for closing and opening of the conduit. Valves of this type may be used for irrigation purposes in agriculture. By controlling the pilot valve of the valve by means of for instance a timer, the valve may automatically be brought to open for the water supply to the spreaders at a predetermined time and again to close the water supply when the irrigation has lasted for a sufficient length of time.

6 Claims, 1 Drawing Figure

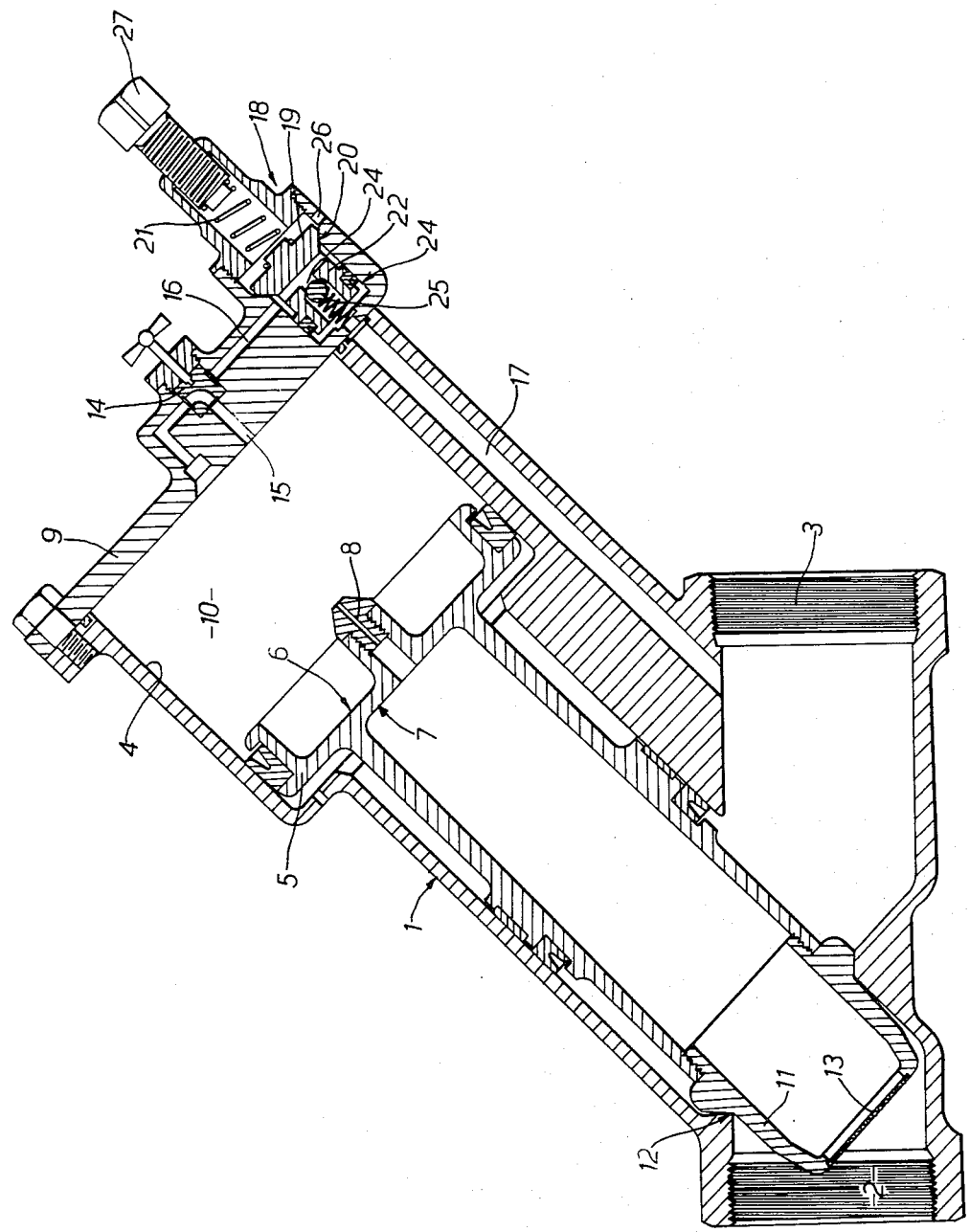

ARRANGEMENT IN OR RELATING TO A VALVE

In an irrigation system in which a number of spreaders with appurtenant branche lines are connected to the downstream side of an automatically opening and possibly closing valve air will often enter into the system downstream of the valve, for instance because the spreaders are placed at different levels. The result of this is that when the valve opens for the next irrigation period, the air must first be displaced. This occurs relatively quickly, however, because the air offers little flow resistance, and the water will therefore flow into the empty part of the system with relatively high velocity. This will in turn give rise to strong water hammers which may lead to extensive damage to lines and spreaders. Even with a valve which opens very slowly water hammers may occur when the line system to be filled is large.

It is the purpose of the invention to provide a valve of the type defined in the introduction which effectively contributes to prevent or reduce water hammers caused as mentioned above. This is obtained according to the invention by a valve means in the conduit or the like downstream of the pilot valve, said valve means being arranged at a predetermined pressure on its downstream side to open its upstream side to the pressure of the surroundings.

It is thus obtained that the valve only will open partly and let through a reduced flow of water as long as the flow resistance is small on the downstream side of the valve. Only when the downstream system is filled with water so that the flow resistance increases, the valve will go to fully open position. Water hammer tendencies are thus effectively reduced in that the line system on the downstream side of the valve is filled considerably slower than if the valve quickly had gone to fully open position.

Further advantageous features of the invention will appear from the dependent claims and from the following description of the examplifying embodiment shown in the drawing.

The valve shown in the drawing comprises a housing 1 with an inlet 2 and an outlet 3. In a cylinder 4 having two different diameters in the housing 1 is slidably arranged a differential piston 5 whose large side 6 and small side 7 are interconnected by means of a narrow bore 8 arranged in the differential piston. The cylinder's 4 wide end is closed by means of a cover 9 so that a chamber 10 is formed on the large side 6 of the differential piston.

At its narrow end the differential piston 5 is equipped with a valve plug 11 which cooperates with a valve seat 12 arranged in the housing 1 between its inlet 2 and outlet 3. The valve plug 11 has an elongate, somewhat conical form so that it will clear a continuously increasing, however relatively small flow cross section during the first part of its opening movement. The valve plug is hollow to be able to let water through to the bore 8 in the differential piston, and in order to prevent solid particles that might be present in the water from plugging the bore 8 the opening of the valve plug is covered by a fine screen 13.

Furthermore, the valve is equipped with a conduit which leads from the chamber 10 to the outlet 3. This conduit may be closed by means of a pilot valve 14. The conduit consists of the three parts 15, 16 and 17. The part 15 leads from the chamber 10 to the pilot valve 14, while a channel part 16 leads on from the pilot valve 14 to a valve means generally designated 18. The conduit part 17 leads from the valve means 18 to the outlet 3 of the valve.

The valve means 18 comprises a valve body 19 which is held against a valve seat 20 of a spring 21. The valve seat is combined with a piston 22 which is sealingly and slidably arranged in a cylinder 23 which is coaxial with the valve body and seat 19, 20. In the piston 22 is arranged a bore 24 which connects the conduit parts 16 and 17. The bore 24 is equipped with a non-return valve 25 which permits flow from the conduit part 16 to the conduit part 17, but not vice versa. On the upper side of the valve seat 20 the cylinder 23 is equipped with an opening 26 to the surroundings.

The spring 21, which at its one end rests against the valve body 19, is at its other end apted upon by an adjustment screw 27.

When the valve is to be opened, the pilot valve 14 is first rotated 180° so that it connects the conduit parts 15 and 16 with each other. Thereby the connection between the chamber 10 and the outlet 3 of the valve is opened. As the pressure in the outlet 3 is considerably lower than in the chamber 10, water will flow through the conduit 15, 16, 17 to the outlet and the pressure in the chamber 10 will fall. Water will continuously be supplied to the chamber 10 through the bore 8 in the differential piston 5, but since the pressure drop in the bore 8 is higher than in the conduit 15, 16, 17, the pressure in the chamber 10 on the large side 6 of the differential piston will be considerably lower than the pressure on the small side 7 of the piston so that the resulting net force will move the differential piston upwards in the cylinder 4. This causes a concurrent movement of the valve plug 11 away from the valve seat 12 so that a gradual but slight opening of the connection between the inlet 2 and the outlet 3 of the valve takes place.

As the differential piston 5 and the valve plug 11 move upwards and release a continuously increasing flow area, the increasing flow from the inlet 2 to the outlet 3 will lead to a slight but gradual increase of the pressure in the outlet 3 due to the increase of the resistance in the downstream system. This slight pressure increase propagates to the chamber 10 and leads to a balance between the forces on the two sides of the differential piston while it is still in an intermediate position. This in turn means that the valve plug 11 will remain in a position where it gives a relatively small flow area and therefore low flow velocity, which in turn leads to a slow and gentle filling of the downstream system.

When the downstream system has been filled with water in this way, the pressure will quickly rise at the outlet 3 of the valve. This pressure propagates through the conduit part 17 to the bottom side of the piston 22 in the valve means 18. However, the pressure cannot propagate to the bore 24 of the piston because the non-return valve 25 will close. When the pressure on the bottom side of the piston has become high enough, the pressure force will overcome the force from the spring 21 and lift the valve body 19 from the seat 20. This places the conduit parts 15, 16 in flow connection with the surroundings via the opening 26 in the wall of the cylinder 23. The chamber 10 thereby becomes a free outlet to the surroundings so that its pressure will fall considerably. Thus the forces on the small side 7 of the differential piston will prevail and move the differential piston and the valve plug 11 quickly to the upper, fully open position.

This quick final opening of the valve obviously leads to a correspondingly quick increase in the valve throughput. However, this may not lead to water hammers in the downstream system because it was filled while the valve was in an intermediate position.

The pressure which will occur in the outlet 3 when the downstream system is filled and the valve is in a suitable intermediate position, will depend i.a. of the supply pressure and the flow resistance in the system. Consequently, there will be a need for adjustability of the pressure at which the valve means 18 opens. According to the invention this is obtained by making the bias from the spring 21 adjustable by means of the adjustment screw 27.

The valve means 18 may for instance be varied by forming the valve body and the piston as separate units. Furthermore, the connection between the conduit parts 16 and 17 does not have to go through the piston, but may be constituted by a separate conduit bypassing the valve means 18.

I claim:

1. Arrangement in or relating to a valve comprising a housing (1) having an inlet (2) and an outlet (3) whose interconnection is closable by means of a differential piston (5) which is slidably arranged in a cylinder (4) in the housing (1), said differential piston being equipped with a bore (8) which connects its large (6) and small (7) sides, said valve further comprising a conduit or the like (15, 16, 17) leading from the chamber (10) in the housing (1) on the large side (6) of the differential piston to the outlet (3), said conduit or the like (15, 16, 17) being equipped with a pilot valve (14) for closing and opening of the conduit, characterized in that in the conduit or the like (16, 17) downstream of the pilot valve (14) is a valve means (18) which is arranged at a predetermined pressuure on its downstream side (17) to open its upstream side (16) to the pressure of the surroundings.

2. Arrangement according to claim 1, characterized in that the valve means (18) comprises a valve body (19) which is movable away from a valve seat (20) by means of a piston (22) against the action of a spring (21).

3. Arrangement according to claim 2, characterized in that the valve body (19) and the piston (22) is in one piece.

4. Arrangement according to claim 2 or 3, characterized in that between the upstream (16) and downstream (17) side of the valve means (18) is arranged a non-return valve (25).

5. Arrangement according to claim 4, characterized in that the non-return valve is arranged in an axial bore (24) in the piston (22).

6. Arrangement according to claim 2, characterized in that the spring is a compression spring which acts between the valve body (19) and an adjustment means (27) which is adjustable in the direction of movement of the valve body.

* * * * *